United States Patent
Yilmaz et al.

(10) Patent No.: US 12,496,156 B2
(45) Date of Patent: Dec. 16, 2025

(54) SURGICAL ROBOTIC SYSTEM WITH VELOCITY LIMITS

(71) Applicant: Covidien LP, Mansfield, MA (US)

(72) Inventors: Burak Yilmaz, Upton, MA (US); William J. Peine, Ashland, MA (US)

(73) Assignee: Covidien LP, Mansfield, MA (US)

( * ) Notice: Subject to any disclaimer, the term of this patent is extended or adjusted under 35 U.S.C. 154(b) by 275 days.

(21) Appl. No.: 18/265,451

(22) PCT Filed: Jan. 7, 2022

(86) PCT No.: PCT/US2022/011612
§ 371 (c)(1),
(2) Date: Jun. 6, 2023

(87) PCT Pub. No.: WO2022/155067
PCT Pub. Date: Jul. 21, 2022

(65) Prior Publication Data
US 2024/0033025 A1    Feb. 1, 2024

Related U.S. Application Data

(60) Provisional application No. 63/137,868, filed on Jan. 15, 2021.

(51) Int. Cl.
*A61B 34/37* (2016.01)
*A61B 34/00* (2016.01)
*A61B 34/30* (2016.01)

(52) U.S. Cl.
CPC .............. *A61B 34/37* (2016.02); *A61B 34/76* (2016.02); *A61B 34/77* (2016.02); *A61B 2034/306* (2016.02)

(58) Field of Classification Search
CPC ......... A61B 34/37; A61B 34/76; A61B 34/77; A61B 2034/306
(Continued)

(56) References Cited

U.S. PATENT DOCUMENTS 5,046,022 A * 9/1991 Conway ................. B25J 9/1689
700/250
6,424,885 B1 * 7/2002 Niemeyer ............... A61B 34/77
600/109

(Continued)

OTHER PUBLICATIONS

International Search Report and Written Opinion of the International Searching Authority issued in corresponding application PCT/US2022/011612 mailed Apr. 20, 2022 (13 pages).

*Primary Examiner* — Jaime Figueroa
(74) *Attorney, Agent, or Firm* — Carter, DeLuca & Farrel

(57) ABSTRACT

A surgical robotic system including a robotic arm and a surgical console. The robotic arm having a plurality of joints and a surgical instrument. The surgical console includes at least one interface device and a controller. The interface device configured to receive a user input. The controller configured to output a command pose based on the user input, wherein the robot arm is configured to move in response to the command pose; process the command pose through a hand pose transform algorithm to generate a desired pose and a previous desired pose; determine a desired delta pose command based on the desired pose, the previous desired pose, and a previous command pose; and process the desired delta pose command through a velocity limiting function to apply at least one velocity limit on the desired delta pose command.

20 Claims, 6 Drawing Sheets

(58) Field of Classification Search
USPC .............. 700/245–264; 318/568.11–568.25
See application file for complete search history.

(56) References Cited

U.S. PATENT DOCUMENTS

| | | | | |
|---|---|---|---|---|
| 6,671,581 | B2* | 12/2003 | Niemeyer | A61B 34/37 |
| | | | | 600/109 |
| 7,155,315 | B2* | 12/2006 | Niemeyer | A61B 34/70 |
| | | | | 382/128 |
| 8,010,180 | B2* | 8/2011 | Quaid | A61B 34/71 |
| | | | | 600/426 |
| 8,414,469 | B2* | 4/2013 | Diolaiti | A61B 34/30 |
| | | | | 700/63 |
| 8,620,473 | B2* | 12/2013 | Diolaiti | A61B 1/00087 |
| | | | | 600/407 |
| 8,911,499 | B2* | 12/2014 | Quaid | A61B 17/1703 |
| | | | | 623/18.11 |
| 9,566,414 | B2* | 2/2017 | Wong | A61M 25/09 |
| 10,231,790 | B2* | 3/2019 | Quaid | A61B 34/20 |
| 10,272,569 | B2* | 4/2019 | Swarup | A61B 34/30 |
| 10,959,798 | B2* | 3/2021 | Diolaiti | A61B 34/37 |
| 2006/0106493 | A1 | 5/2006 | Niemeyer et al. | |
| 2006/0142657 | A1* | 6/2006 | Quaid | A61B 90/37 |
| | | | | 600/424 |
| 2009/0000626 | A1* | 1/2009 | Quaid | A61B 17/1695 |
| | | | | 128/898 |
| 2009/0000627 | A1* | 1/2009 | Quaid | A61N 1/3605 |
| | | | | 128/898 |
| 2019/0125462 | A1* | 5/2019 | Peine | A61B 34/74 |
| 2019/0201152 | A1* | 7/2019 | Diolaiti | A61B 34/37 |
| 2020/0261160 | A1* | 8/2020 | Peine | A61B 34/37 |
| 2022/0032454 | A1* | 2/2022 | Yang | B25J 9/1612 |

* cited by examiner

SURGICAL ROBOTIC SYSTEM WITH VELOCITY LIMITS

CROSS REFERENCE TO RELATED APPLICATIONS

The present application is a U.S. National Stage Application filed under 35 U.S.C. § 371(a) of International Patent Application No. PCT/US2022/011612, filed Jan. 7, 2022, which claims the benefit of and priority to U.S. Patent Provisional Application No. 63/137,868, filed Jan. 15, 2021. The entire disclosures of the foregoing applications are incorporated by reference herein.

FIELD

The present disclosure generally relates to a surgical robotic systems, and more particularly, to systems providing velocity limits on surgical instruments coupled to robotic arms of surgical robotic systems.

BACKGROUND

Surgical robotic systems are currently being used in minimally invasive medical procedures. Some surgical robotic systems include a surgical console controlling a surgical robotic arm and a surgical instrument having an end effector (e.g., forceps or grasping instrument) coupled by a wrist assembly to and actuated by the robotic arm. In operation, as the surgical instrument is actuated near the remote center of motion point, rotation and pivoting of the surgical instrument may have undesirable impact on the internal tissue caused by unexpected amplification of the force and speed of various components of the robotic arm and surgical instruments. Thus, there is a need for a surgical robotic system that is capable of limiting the velocity of the rotation and pivot of the surgical instrument.

SUMMARY

In one aspect, a surgical robotic system includes a surgical console and a robotic arm having a plurality of joints and a surgical instrument. The surgical console includes at least interface device and a controller. The interface device is configured to receive a user input. The controller is configured to: output a command pose based on the user input, wherein the robot arm is configured to move in response to the command pose; process the command pose through a hand pose transform algorithm to generate a desired pose and a previous desired pose; determine a desired delta pose command based on the desired pose, the previous desired pose, and a previous command pose; and process the desired delta pose command through a velocity limiting function to apply at least one velocity limit on the desired delta pose command.

In aspects, the desired delta pose command may include a delta position command, a delta orientation command, and a delta jaw command.

In aspects, the velocity limiting function may adaptively generate limits for a translational velocity of the delta position command based on a distance of the surgical instrument to a remote center point.

In aspects, the limits for the translational velocity of the delta position command may include a maximum translational velocity.

In aspects, the maximum translational velocity may be based on a maximum allowed speed for a distal end portion of surgical instrument, minimum allowed distance for teleoperation, and distance of the surgical instrument to the remote center point.

In aspects, the velocity limiting function may convert the delta orientation command to an axis angle representation, wherein the axis angle representation may include a rotation axis and amount of rotation around the axis.

In aspects, the velocity limiting function may adaptively generate limits on a rotational velocity of the amount of rotation around the axis while the axis rotation remains unchanged.

In aspects, the velocity limiting function may generate limits of the rotational velocity of the delta orientation command based on the amount of rotation around the axis with the rotational velocity limits and the axis rotation.

In aspects, the controller may be further configured to process the command pose and the desired delta pose command through a motion integrator algorithm to generate haptic feedback regardless whether the robotic arm is at a boundary of a physical workspace of the robotic arm.

In another aspect, a surgical robotic system includes a surgical console and a robotic arm having a plurality of joints and a surgical instrument. The surgical console includes at least interface device and a controller. The interface device is configured to receive a user input. The controller is configured to: output a command pose based on the user input, wherein the robot arm is configured to move in response to the command pose; calculate a desired delta pose based on a desired pose, a previous desired pose, and a previous command pose to adjust a delta pose between the desired pose and the command pose to the desired delta pose as the robot arm moves in response to the command pose; and apply at least one velocity limit on the desired delta pose.

In aspects, the desired delta pose command may include a delta position command, a delta orientation command, and a delta jaw command and the controller may be further configured to generate a minimum and maximum translation velocity for the delta position command of the desired delta pose or generating a minimum and maximum rotational velocity of the delta orientation command of the desired delta pose.

In another aspect, a method for controlling a surgical robotic system includes: inputting a user input through at least one interface device coupled to a surgical console, the user input including a movement command to move at least a portion of a robotic arm having a plurality of joints and a surgical instrument; outputting a command pose based on the user input; processing the command pose through a hand pose transform algorithm to generate a desired pose and a previous desired pose; determining a desired delta pose command based on the desired pose, the previous desired pose, and a previous command pose; and processing the desired delta pose command through a velocity limiting function to apply at least one velocity limit on the desired delta pose command.

In aspects, the desired delta pose command may include a delta position command, a delta orientation command, and a delta jaw command.

In aspects, processing the desired delta pose command through the velocity limiting function may include adaptively generating limits for a translational velocity of the delta position command based on a distance of the surgical instrument to a remote center point.

In aspects, the limits for the translational velocity of the delta position command may include a maximum translational velocity.

In aspects, the maximum translational velocity may be based on a maximum allowed speed for a distal end portion of surgical instrument, the minimum allowed distance for teleoperation, and the distance of the surgical instrument to the remote center point.

In aspects, processing the desired delta pose command through the velocity limiting function may include converting the delta orientation command to an axis angle representation having a rotation axis rotation and an amount of rotation around the axis.

In aspects, converting the delta orientation command to the axis angle representation may include adaptively generating limits on a rotational velocity of the amount of rotation around the axis while the axis rotation remains unchanged.

In aspects, processing the desired delta pose command through the velocity limiting function may include generating limits of the rotational velocity of the delta orientation command based on the amount of rotation around the axis with the rotational velocity limits and the axis rotation.

In aspects, the method may further include processing the command pose and the desired delta pose command through a motion integrator algorithm to generate haptic feedback regardless whether the robotic arm is at a boundary of a physical workspace of the robotic arm.

BRIEF DESCRIPTION OF THE DRAWINGS

Various aspects of the present disclosure are described herein with reference to the drawings wherein.

DETAILED DESCRIPTION

Figure 1:
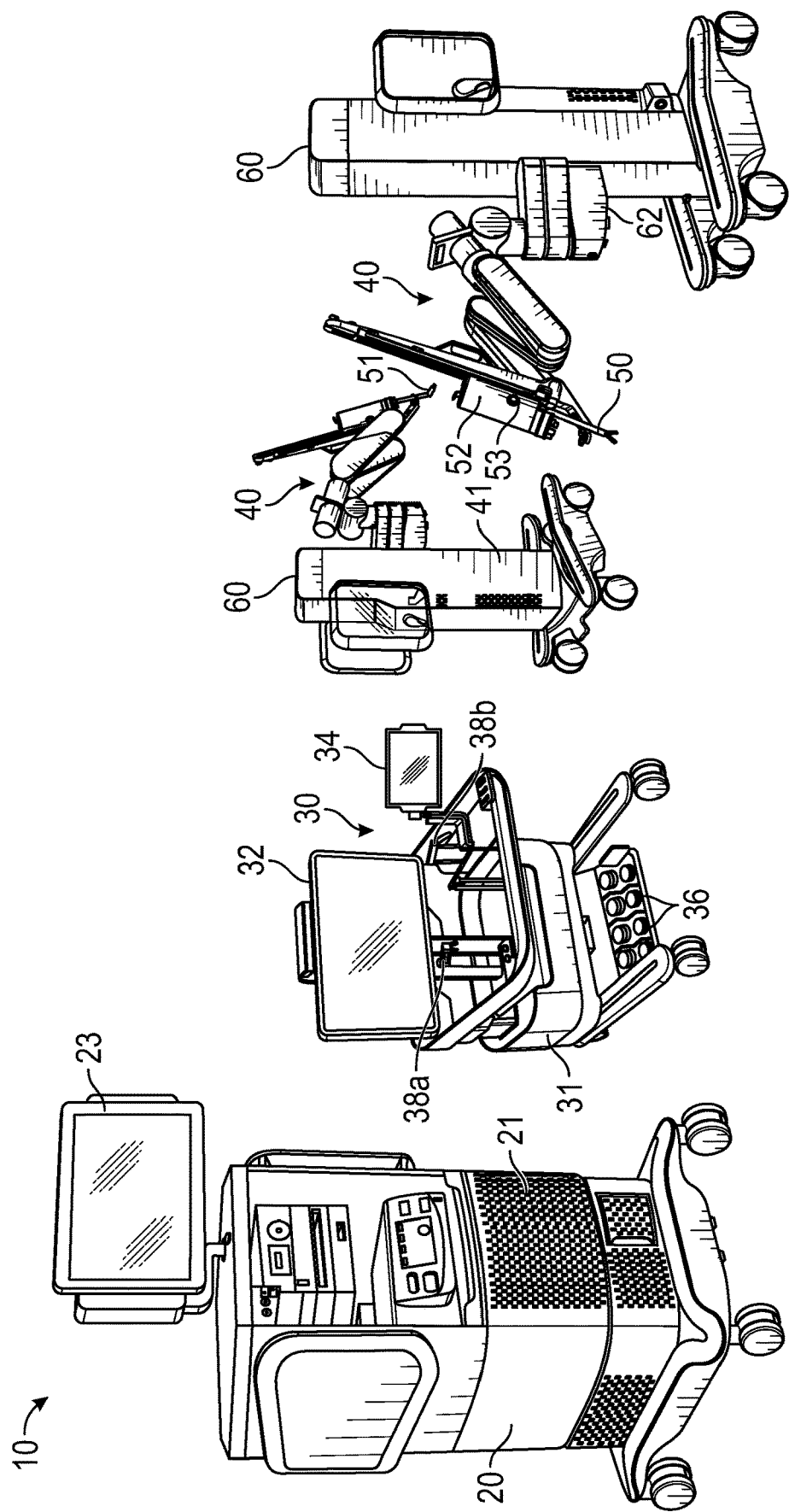
FIG. 1 is a schematic illustration of a surgical robotic system including a control tower, a console, and one or more surgical robotic arms according to an aspect of the present disclosure.

Aspects of the presently disclosed surgical robotic system are described in detail with reference to the drawings, in which like reference numerals designate identical or corresponding elements in each of the several views. As used herein the term "distal" refers to the portion of the surgical robotic system and/or the surgical instrument coupled thereto that is closer to the patient, while the term "proximal" refers to the portion that is farther from the patient.

The term "application" may include a computer program designed to perform functions, tasks, or activities for the benefit of a user. Application may refer to, for example, software running locally or remotely, as a standalone program or in a web browser, or other software which would be understood by one skilled in the art to be an application. An application may run on a controller, or on a user device, including, for example, a mobile device, an IOT device, or a server system.

As will be described in detail below, the present disclosure is directed to a surgical robotic system which includes a surgical console, a control tower, and one or more movable carts having a surgical robotic arm coupled to a setup arm. The surgical console receives user input through one or more interface devices. The user input is interpreted by the control tower as a movement command for moving the surgical robotic arm. A controller is configured to process the movement command and to generate a torque command for activating one or more actuators of the robotic arm, which, in turn, move the robotic arm in response to the movement command.

With reference to FIG. 1, a surgical robotic system 10 includes a control tower 20, which is connected to all of the components of the surgical robotic system 10 including a surgical console 30 and one or more robotic arms 40. Each of the robotic arms 40 includes a surgical instrument 50 removably coupled thereto. Each of the robotic arms 40 is also coupled to a movable cart 60.

The surgical instrument 50 is configured for use during minimally invasive surgical procedures. The surgical instrument 50 may be configured for open surgical procedures. The surgical instrument 50 may be an endoscope, such as an endoscope camera 51, configured to provide a video feed for the clinician. The surgical instrument 50 may be an electrosurgical forceps having a pair of opposing jaw members (not shown) configured to seal tissue by compression tissue between the jaws and applying electrosurgical current thereto. The surgical instrument 50 may be a surgical stapler including a pair of jaws configured to grasp and clamp tissue whilst deploying a plurality of tissue fasteners, e.g., staples, and cutting stapled tissue. Other useful surgical instruments will be apparent to one skilled in the art reading this disclosure.

One of the robotic arms 40 may include a camera 51 configured to capture video of the surgical site. The surgical console 30 includes a first display 32, which displays a video feed of the surgical site provided by camera 51, and a second display 34, which displays a user interface for controlling the surgical robotic system 10. The first and second displays 32 and 34 are touchscreens allowing for various graphical user inputs.

The surgical console 30 also includes a plurality of user interface devices, such as foot pedals 36 and a pair of handle controllers 38a and 38b which are used by a user to remotely control robotic arms 40. The surgical console further includes an armrest (not shown) used to support clinician's arms while operating the handle controllers 38a and 38b.

The control tower 20 includes a display 23, which may be a touchscreen, and outputs on the graphical user interfaces (GUIs). The control tower 20 also acts as an interface between the surgical console 30 and one or more robotic arms 40. In particular, the control tower 20 is configured to control the robotic arms 40, such as to move the robotic arms 40 and the corresponding surgical instrument 50, based on a set of programmable instructions and/or input commands from the surgical console 30, in such a way that robotic arms 40 and the surgical instrument 50 execute a desired movement sequence in response to input from the foot pedals 36 and/or the handle controllers 38a and 38b.

Each of the control tower 20, the surgical console 30, and the robotic arm 40 includes a respective computer 21, 31, 41. The computers 21, 31, 41 are interconnected to each other using any suitable communication network based on wired or wireless communication protocols. The term "network," whether plural or singular, as used herein, denotes a data network, including, but not limited to, the Internet, Intranet, a wide area network, or a local area networks, and without limitation as to the full scope of the definition of communication networks as encompassed by the present disclosure. Suitable protocols include, but are not limited to, transmission control protocol/internet protocol (TCP/IP), datagram protocol/internet protocol (UDP/IP), and/or datagram congestion control protocol (DCCP). Wireless communication may be achieved via one or more wireless configurations, e.g., radio frequency, optical, Wi-Fi, Bluetooth (an open wireless protocol for exchanging data over short distances, using short length radio waves, from fixed and mobile devices, creating personal area networks (PANs), ZigBee® (a specification for a suite of high level communication protocols using small, low-power digital radios based on the IEEE 122.15.4-2003 standard for wireless personal area networks (WPANs)).

The computers 21, 31, 41 may include any suitable processor (not shown) operably connected to a memory (not shown), which may include one or more of volatile, non volatile, magnetic, optical, or electrical media, such as read-only memory (ROM), random access memory (RAM), electrically-erasable programmable ROM (EEPROM), non-volatile RAM (NVRAM), or flash memory. The processor may be any suitable processor (e.g., control circuit) adapted to perform the operations, calculations, and/or set of instructions described in the present disclosure including, but not limited to, a hardware processor, a field programmable gate array (FPGA), a digital signal processor (DSP), a central processing unit (CPU), a microprocessor, and combinations thereof. Those skilled in the art will appreciate that the processor may be substituted for by using any logic processor (e.g., control circuit) adapted to execute algorithms, calculations, and/or set of instructions described herein.

Figure 2:
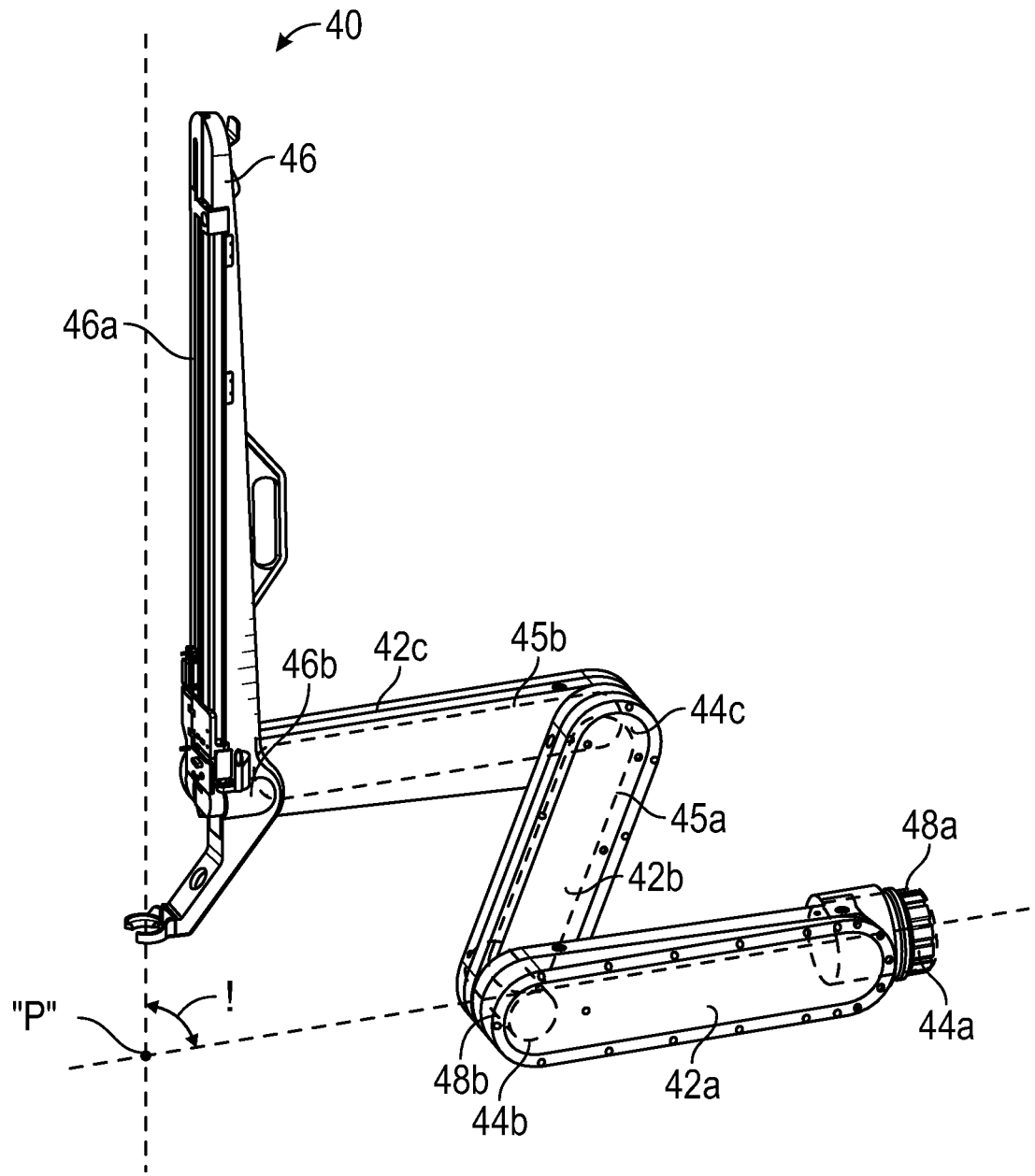
FIG. 2 is a perspective view of a surgical robotic arm of the surgical robotic system of FIG. 1.
Figure 3:
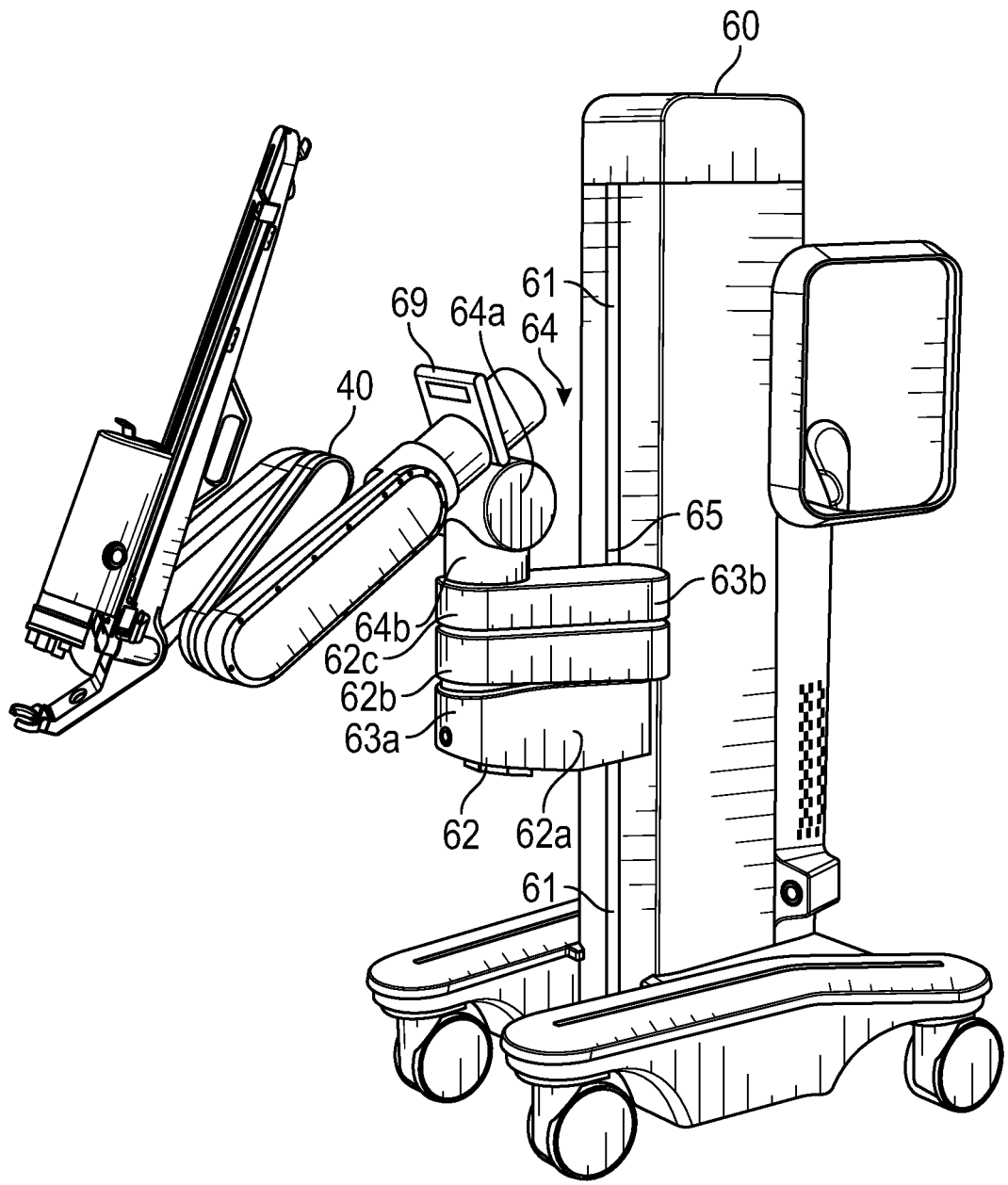
FIG. 3 is a perspective view of a setup arm with the surgical robotic arm of the surgical robotic system of FIG. 1.

With reference to FIG. 2, each of the robotic arms 40 may include a plurality of links 42a, 42b, 42c, which are interconnected at joints 44a, 44b, 44c, respectively. The joint 44a is configured to secure the robotic arm 40 to the movable cart 60 and defines a first longitudinal axis. With reference to FIG. 3, the movable cart 60 includes a lift 61 and a setup arm 62, which provides a base for mounting of the robotic arm 40. The lift 61 allows for vertical movement of the setup arm 62. The movable cart 60 also includes a display 69 for displaying information pertaining to the robotic arm 40.

The setup arm 62 includes a first link 62a, a second link 62b, and a third link 62c, which provide for lateral maneuverability of the robotic arm 40. The links 62a, 62b, 62c are interconnected at joints 63a and 63b, each of which may include an actuator (not shown) for rotating the links 62b and 62b relative to each other and the link 62c. In particular, the links 62a, 62b, 62c are movable in their corresponding lateral planes that are parallel to each other, thereby allowing for extension of the robotic arm 40 relative to a patient on a surgical table (not shown). The robotic arm 40 may be coupled to the surgical table (not shown). The setup arm 62 includes controls for adjusting movement of the links 62a, 62b, 62c as well as the lift 61.

The third link 62c includes a rotatable base 64 having two degrees of freedom. In particular, the rotatable base 64 includes a first actuator 64a and a second actuator 64b. The first actuator 64a is rotatable about a first stationary arm axis which is perpendicular to a plane defined by the third link 62c and the second actuator 64b is rotatable about a second stationary arm axis which is transverse to the first stationary arm axis. The first and second actuators 64a and 64b allow for full three-dimensional orientation of the robotic arm 40.

With reference to FIG. 2, the robotic arm 40 also includes a holder 46 defining a second longitudinal axis and configured to receive an instrument drive unit (IDU) 52 (FIG. 1). The IDU 52 is configured to couple to an actuation mechanism of the surgical instrument 50 and/or the camera 51 and is configured to move (e.g., rotate) and actuate the instrument 50 and/or the camera 51. IDU 52 transfers actuation forces from its actuators to the surgical instrument 50 to actuate components (e.g., end effectors) of the surgical instrument 50. The holder 46 includes a sliding mechanism 46a, which is configured to move the IDU 52 along the second longitudinal axis defined by the holder 46. The holder 46 also includes a joint 46b, which rotates the holder 46 relative to the link 42c.

The robotic arm 40 also includes a plurality of manual override buttons 53 (FIG. 1) disposed on the IDU 52 and the setup arm 62, which may be used in a manual mode. The clinician may press one or the buttons 53 to move the component associated with the button 53.

The joints 44a and 44b include an actuator 48a and 48b (FIG. 2) configured to drive the joints 44a, 44b, 44c relative to each other through a series of belts 45a and 45b or other mechanical linkages such as a drive rod, a cable, or a lever and the like. In particular, the actuator 48a is configured to rotate the robotic arm 40 about a longitudinal axis defined by the link 42a.

The actuator 48b of the joint 44b is coupled to the joint 44c via the belt 45a, and the joint 44c is in turn coupled to the joint 46c via the belt 45b. Joint 44c may include a transfer case coupling the belts 45a and 45b, such that the actuator 48b is configured to rotate each of the links 42b, 42c and the holder 46 relative to each other. More specifically, links 42b, 42c, and the holder 46 are passively coupled to the actuator 48b which enforces rotation about a remote center point "P" which lies at an intersection of the first axis defined by the link 42a and the second axis defined by the holder 46. Thus, the actuator 48b controls the angle θ between the first and second axes allowing for orientation of the surgical instrument 50. Due to the interlinking of the links 42a, 42b, 42c, and the holder 46 via the belts 45a and 45b, the angles between the links 42a, 42b, 42c, and the holder 46 are also adjusted in order to achieve the desired angle θ. Some or all of the joints 44a, 44b, 44c may include an actuator to obviate the need for mechanical linkages.

Figure 4:
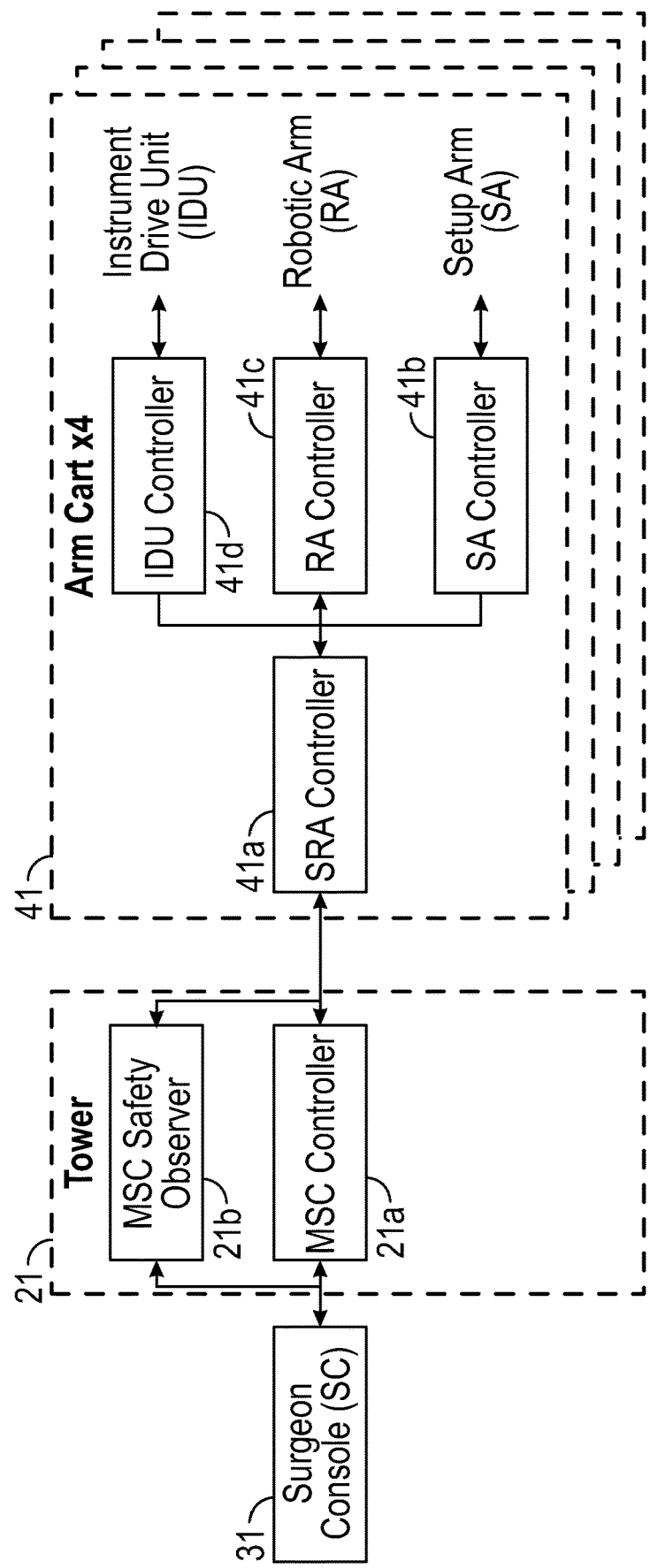
FIG. 4 is a schematic diagram of a computer architecture of the surgical robotic system of FIG. 1.

With reference to FIG. 4, each of the computers 21, 31, 41 of the surgical robotic system 10 may include a plurality of controllers, which may be embodied in hardware and/or software. The computer 21 of the control tower 20 includes a controller 21a and a safety observer 21b. The controller 21a receives data from the computer 31 of the surgical console 30 about the current position and/or orientation of the handle controllers 38a and 38b and the state of the foot pedals 36 and interface devices. The controller 21a processes these positions/orientations to determine desired drive commands for each joint of the robotic arm 40 and/or the IDU 52 and communicates these to the computer 41 of the robotic arm 40. The controller 21a also receives back the actual joint angles and uses this information to determine force feedback commands that are transmitted back to the computer 31 of the surgical console 30 to provide haptic feedback through the handle controllers 38a and 38b that include one or more haptic feedback vibratory devices that output a haptic feedback. The safety observer 21b performs validity checks on the data going into and out of the controller 21a and notifies a system fault handler if errors in the data transmission are detected, and if so, places the computer 21 and/or the surgical robotic system 10 into a safe state.

The computer 41 includes a plurality of controllers, namely, a main cart controller 41a, a setup arm controller 41b, a robotic arm controller 41c, and an instrument drive unit (IDU) controller 41d. The main cart controller 41a receives and processes joint commands from the controller 21a of the computer 21 and communicates them to the setup arm controller 41b, the robotic arm controller 41c, and the IDU controller 41d. The main cart controller 41a also manages instrument exchanges and the overall state of the movable cart 60, the robotic arm 40, and the IDU 52. The main cart controller 41a also communicates actual joint angles back to the controller 21a.

The setup arm controller 41b controls each of joints 63a and 63b, and the rotatable base 64 of the setup arm 62 and calculates desired motor movement commands (e.g., motor torque) for the pitch axis and controls the brakes. The robotic arm controller 41c controls each joint 44a and 44b of the robotic arm 40 and calculates desired motor torques required for gravity compensation, friction compensation, and closed loop position control of the robotic arm 40. The robotic arm controller 41c calculates a movement command based on the calculated torque. The calculated motor commands are then communicated to one or more of the actuators 48a and 48b in the robotic arm 40. The actual joint positions are then transmitted by the actuators 48a and 48b back to the robotic arm controller 41c.

The IDU controller 41d receives desired joint angles for the surgical instrument 50, such as wrist and jaw angles, and computes desired currents for the motors in the IDU 52. The IDU controller 41d calculates actual angles based on the motor positions and transmits the actual angles back to the main cart controller 41a.

Figure 5:
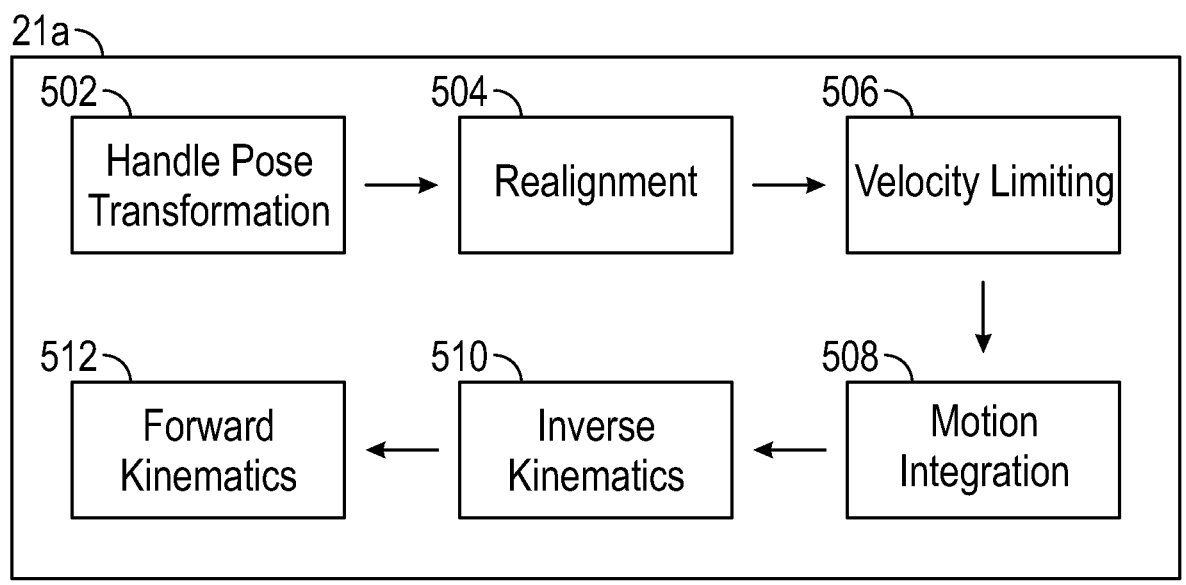
FIG. 5 is a block diagram illustrating the components of a controller of a surgical robotic system according to an aspect of the present disclosure.

Control of the robotic arm 40 will be described with reference to FIG. 5. Initially, a pose of the handle controller 40 controlling the robotic arm 40, e.g., the handle controller 38a, is transformed into a desired pose of the robotic arm 40 through a hand eye transform function, e.g., handle pose transformation function 502, executed by the controller 21a. The hand eye function, as well as other functions described herein, is/are embodied in software executable by the controller 21a or any other suitable controller described herein. The pose of one of the handle controller 38a may be embodied as a coordinate position and role-pitch-yaw ("RPY") orientation relative to a coordinate reference frame, which is fixed to the surgical console 30. The desired pose of the instrument 50 is relative to a fixed frame on the robotic arm 40. The pose of the handle controller 38a is then scaled by a scaling function executed by the controller 21a. The coordinate position may be scaled down and the orientation may be scaled up by the scaling function. In addition, the controller 21a also executes a clutching function, which disengages the handle controller 38a from the robotic arm 40. In particular, the controller 21a stops transmitting movement commands from the handle controller 38a to the robotic arm 40 if certain movement limits or other thresholds are exceeded and in essence acts like a virtual clutch mechanism, e.g., limits mechanical input from effecting mechanical output.

The desired pose of the robotic arm 40, which is based on the pose of the handle controller 38a, is passed through a realignment function 504 executed by the controller 21a along with the previous command pose. The realignment function 504 generates a desired delta pose for the robotic arm 40 and adjusts the delta pose including a delta orientation command ($\Delta R_c$), a delta jaw command ($\Delta \theta_c$), and a delta position command ($\Delta p_c$). As a result, the realignment function 504 is configured to adjust misalignment between desired inputs and command outputs by reducing the delta orientation and the delta jaw command.

The realignment function 504 determines whether there is misalignment between the orientation command and/or jaw command. Misalignment between the orientation command and the jaw command may occur due to user intervention such as, for example, user applied clutching, user interface devices exceeding rotation speeds, joint speeds, and/or jaw opening velocity limits by the user, user exceeding instrument range of motion limits, user applied instrument or image flip, and user changes in orientation scaling values or handle assignment.

The realignment function 504 adjusts the delta jaw command ($\Delta \theta_c$) based on a comparison of the misalignment of the jaw command ($\theta_{misalignment}$) and the change in percent ratio ($\Delta \theta_p$) with respect to the previous command. If the misalignment of the jaw command ($\theta_{misalignment}$) and the change in percent ratio ($\Delta \theta_p$) have the same sign, the change in percent ratio ($\Delta \theta_p$) is amplified by a positive constant proportion ($\alpha_{reward}$), $\Delta \theta_c = (\Delta \theta_p) + (\Delta \theta_p) \times (\alpha_{reward})$. Otherwise, the change in percent ratio ($\Delta \theta_p$) is reduced by a negative constant proportion ($\alpha_{punish}$), $\Delta \theta_c = (\Delta \theta_p) + (\Delta \theta_p) \times (\alpha_{punish})$. As the change in percent ratio ($\Delta \theta_p$) is either amplified or reduced based on the comparison, the misalignment of the jaw command ($\theta_{misalignment}$) is driven to zero. To avoid over-realignment, during user input, the realignment function 504 determines whether the magnitude of the adjustment, the change in percent ratio ($\Delta \theta_p$) multiplied by $\alpha_{reward}$ or $\alpha_{punish}$, is greater than the magnitude of the misalignment of the jaw command ($\theta_{misalignment}$). If so, the misalignment of the jaw command ($\theta_{misalignment}$) is used to adjust the delta jaw command ($\Delta \theta_c$) by adding the change in percent ratio ($\Delta \theta_p$) and the misalignment of the jaw command ($\theta_{misalignment}$). In the event that the misalignment of the jaw command ($\theta_{misalignment}$) is less than a predetermined percentage, such as, for example 1%, the delta jaw command ($\Delta \theta_c$) is the change in percent ratio ($\Delta \theta_p$).

To adjust the delta orientation command ($\Delta R_c$), the realignment function 504 calculates the motion output (R) based on the previous command orientation ($R_C$) multiplied by a delta pitch and yaw ($R_{AP}$) and delta roll ($R_{A\theta}$). The delta pitch and yaw ($R_{AP}$) and the misalignment of the orientation ($R_{misalignment}$) are converted from a matrix to an angle axis representation. Once converted, the realignment function 504 calculates the cosine of the angles between the pitch and yaw ($\cos(\gamma)$). The closer the $\cos(\gamma)$ is to 1, the misalignment of the orientation ($R_{misalignment}$) and the delta pitch and yaw ($R_{AP}$) are considered to be "in the same direction" resulting in application of a small punishing adjustment. Otherwise, the closer the $\cos(\gamma)$ is to −1, the misalignment of the orientation ($R_{misalignment}$) and the delta pitch and yaw ($R_{AP}$) are considered to "in the opposite direction" resulting in applying a large adjustment. The adjusted delta orientation command ($\Delta R_c$) is generated by multiplying the adjustment to the $\cos(\gamma)$ with a predetermined constant scaler to reduce the adjustments made as a misalignment of the orientation ($R_{misalignment}$) direction and a delta pitch and yaw ($R_{AP}$) direction become more orthogonal. In the event the misalignment of the orientation ($R_{misalignment}$) direction and the delta pitch and yaw ($R_{AP}$) direction are exactly orthogonal, the realignment function 504 does not perform realignment.

The realignment function 504 determines a delta position command ($\Delta p_c$) based on the difference between the current and previous input position. The desired delta pose for the robotic arm 40 is passed through the velocity limiting function 506 executed by the controller 21a to generate limits for the translational velocity of the delta position command ($\Delta p_c$) and limits for the rotational velocity of the delta orientation command ($\Delta R_c$).

The limits for the translational velocity of the delta position command ($\Delta p_c$) is determined adaptively based on the distance of the surgical instrument 50 (e.g., a wrist base of the surgical instrument 50) to the remote center point "P." The closer the wrist base of the surgical instrument 50 is to the remote center point "P" the lower the maximum limit of the translational velocity, which keeps a tip (i.e., end effector) of the surgical instrument 50 under a threshold value. The motion of the wrist base of the surgical instrument 50 corresponds to the motion of the tip of the surgical instrument 50. As such, the velocity of the tip of the surgical instrument multiplied by the distance of the instrument to the remote center point "P" is equivalent to the velocity of the instrument multiplied by the distance of the tip of the surgical instrument to the remote center point "P." Based on the relationship between the motion of the wrist base of the surgical instrument 50 and the tip of the surgical instrument 50, the maximum velocity allowed for the tip of the surgical instrument 50, e.g., 1.5 m/s, is set as the maximum translational velocity of the delta position command ($\Delta p_c$). Due to the relationship between the motion of the wrist base of the surgical instrument 50 and the tip of the surgical instrument 50 and based on the maximum velocity of the tip of the surgical instrument, the minimum translational velocity of the delta position command ($\Delta p_c$) is the maximum allowed speed for the tip velocity multiplied by the result of the distance of the tip of the surgical instrument 50 to the remote center point "P" (e.g., the minimum distance at which the teleoperation is permitted) divided by the distance of the surgical instrument 50 to the remote center point "P."

The limits of the rotational velocity of the delta orientation command ($\Delta R_c$) are determined through conversion of the delta orientation command ($\Delta R_c$) to an axis angle representation ($\omega$, $\theta$), where $\omega$ is the unit vector representing the axis of rotation and $\theta$ is a positive angle representing the amount of rotation around the axis. The velocity limiting function 506 adaptively generates limits on the rotational velocity ($\Delta\_rot\_max$) based on the "RPY" configuration of the wrist of the surgical instrument 50. Based on the limits on the rotational velocity ($\Delta\_rot\_max$), the amount of rotation around the axis is limited ($\theta^{limited}$) while the axis of rotation ($\omega$) remains unchanged. Once the limited rotation around the axis ($\theta^{limited}$) is determined, the axis angle representation ($\omega$, $\theta^{limited}$) is reconstructed back into the limits of the rotational velocity of the delta orientation command ($\Delta R_c$). Additionally, and/or alternatively, the velocity limiting function 506 may adaptively generate limits on the rotational velocity ($\Delta\_rot\_max$) based on the distance of the wrist of the surgical instrument 50 to remote center point "P" and the amount of pitching of the jaw, determined based on the angle by which the jaw of the surgical instrument 50 points away from the shaft.

The controller 21a is configured to perform a motion integrator function 508. The motion integrator function 508 outputs a desired pose including position and orientation for the robotic arm 40 including the instrument 50, which is then provided to the inverse kinematics function. The motion integrator acts as an integrator block with an externally set initial condition input and a reset input. The motion integrator performs two functions. First, the motion integrator sets its initial output to the measured values, such as position and orientation of the robotic arm 40, and whenever a reset signal is received, the motion integrator performs a reset. Second, the motion integrator adds the delta pose with translational and rotational velocity limits calculated as the output of the realignment function 504 and velocity limiting function 506 to the previous command values to calculate the new commands.

Figure 6:
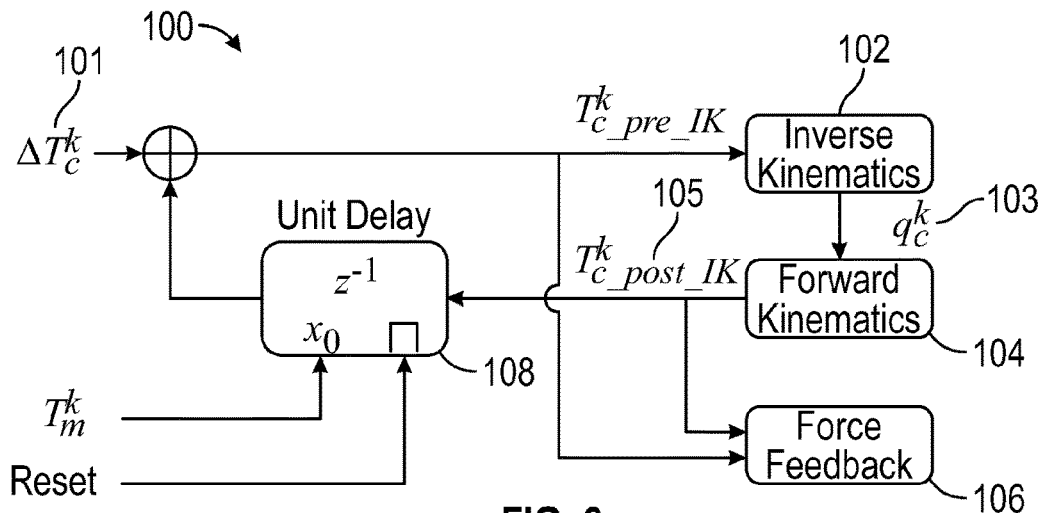
FIG. 6 is a flow chart of a motion integrator for controlling motion of a surgical robotic arm and providing force feedback according to one embodiment of the present disclosure.

A first embodiment of the motion integrator 100 is shown in FIG. 6. Initially, a command pose 101 is provided by the computer 31 of the surgical console 30 from the handle controllers 38a and 38b. The command pose 101 is provided to an inverse kinematics function 102 executed by the controller 21a. The inverse kinematics function 102 calculates various joint parameters, such as angles for the joints 44a, 44b, 44c, that achieve the command pose 101 in a physical workspace defining physical limits of motion for the joints 44a, 44b, 44c. Thus, given the location of the end effector of the instrument 50, inverse kinematics function 102 calculates the joint angles required to move the end-effector of the instrument 50 to that location.

Output 103 of the inverse kinematics function 102 is supplied to a forward kinematics function 104, which computes the position of the robotic arm 40 from specified values for the joint parameters. Thus, given the joint angle values, forward kinematics function 104 calculates the end effector location in the coordinate space. Position output 105 of the forward kinematics function 104 is supplied to a force feedback function 106, which calculates haptic feedback parameters, such as amplitude, frequency, and duration, that are provided through the handle controllers 38a and 38b. The force feedback function 106 also receives the command pose 101, which is also used in calculating haptic feedback parameters. The forward kinematics function 104 also provides the position output 105 to a pose reset function 108, which also receives as input measured pose of the robotic arm 40, namely, joint angles of the joints 44a, 44b, 44c, and the reset signal. In addition, the output of the pose reset function 108 is combined with the command pose 101.

In the motion integrator 100, the command pose 101 stays within the workspace of the robotic arm 40 allowing the command pose 101 to move away from the workspace at most by the maximum allowed motion in one step (i.e., command). However, if one or more of the joints 44a, 44b, 44c of the robotic arm 40 is at the maximum range of motion when the clinician attempts to move that joint beyond that maximum, then the motion integrator 100 does not generate force feedback, namely, the force feedback function 106 would not output any haptic feedback parameters. Thus, the clinician can hit the insertion limit of the instrument 50, and keep pushing the handle controllers 38a and 38b forward to insert more, but since the previous command always stays at the joint boundary, the pre and post desired positions of the inverse kinematics function 102 are the same, resulting in no feedback to the clinician about why the instrument 50 is not responding to the motion of the handle controllers 38a and 38b.

Figure 7:
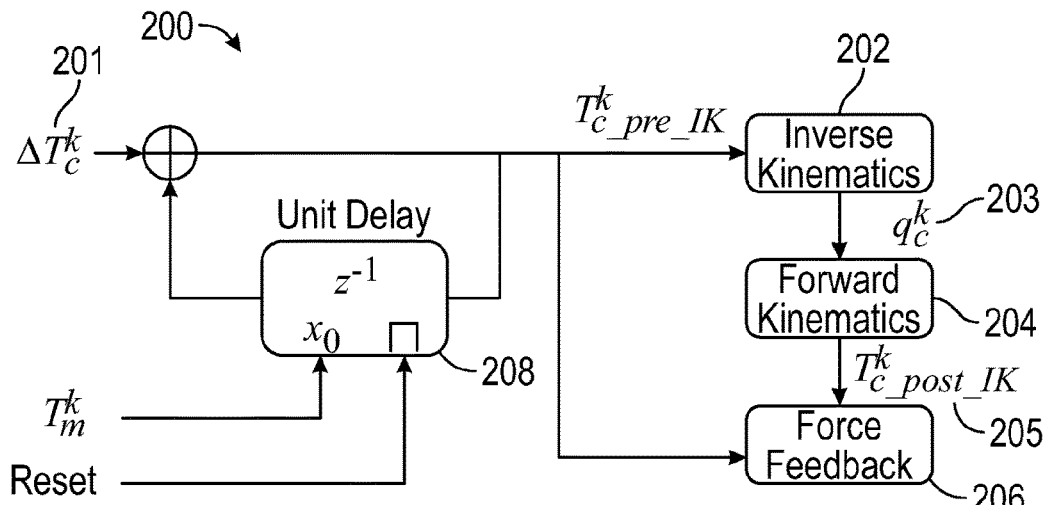
FIG. 7 is a flow chart of a motion integrator for controlling motion of a surgical robotic arm and providing force feedback according to another embodiment of the present disclosure.

Another embodiment of the motion integrator 200 is shown in FIG. 7. The motion integrator 200 has the same functions as the motion integrator 100, in which like reference numerals designate identical or corresponding elements, however, some of the inputs and outputs are different and are described below. In particular, the command pose 201 is provided to the force feedback function 206, which also receives the position output 205 from the forward kinematics function 204. In addition, the pose reset function 208 receives the command pose 201, rather than the position output 205 from the forward kinematics function 204.

In the motion integrator 200, the command pose 201 that is generated is not aware or bounded by the edges of the joint boundaries, or the location of the robotic arm 40, unless the previous command value is reset at measured pose in response to the reset signal. As long as the reset signal is not issued, the desired pose can be driven to any value. One advantage of the motion integrator 200 is that the command pose 201 and the position output 205 differ if the command pose 201 goes out of the workspace, resulting in force feedback that drives the handle controllers 38a and 38b in the direction bringing the instrument 50 towards the boundary that is breached. Though there is force feedback, it is still possible to generate the command pose 201 that may directly pass over the point "P", from one side to the other, which may result in either jumps in desired position or high-speeds, depending on the control scheme that is used.

The motion integrator 200 does not have any algorithmic bounds on how far the command pose 201 can go away from the workspace of the robotic arm 40, putting all the burden on the force feedback function 206 to keep the command pose 201 close to the workspace. This creates difficulties in traversing the singular configurations.

Figure 8:
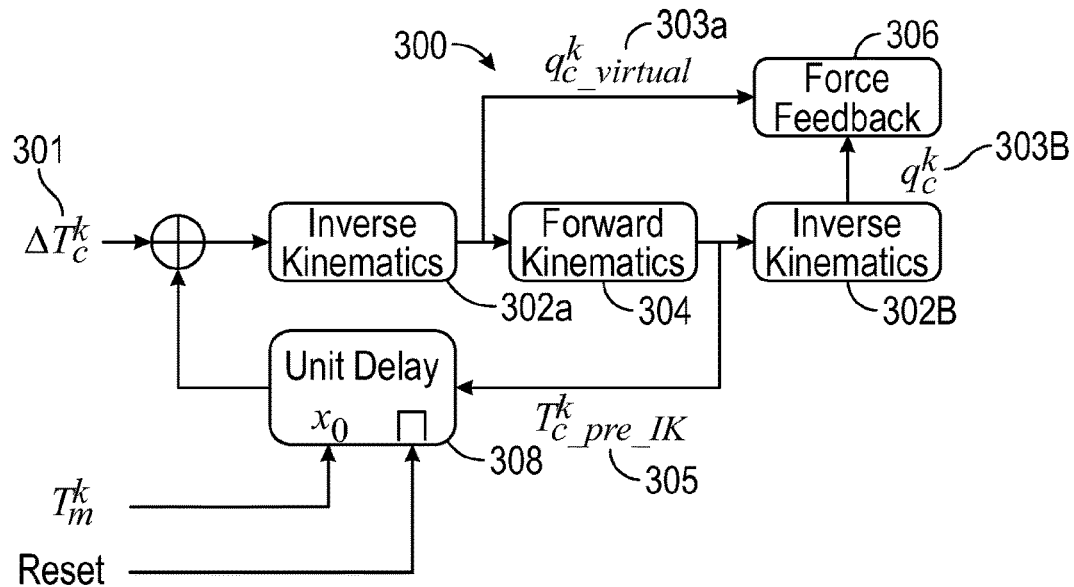
FIG. 8 is a flow chart of a motion integrator for controlling motion of a surgical robotic arm and providing force feedback according to a further embodiment of the present disclosure.

A further embodiment of the motion integrator 300 is shown in FIG. 8. The motion integrator 300 combines benefits of the motion integrators 100 and 200 and has the same functions as the motion integrators 100 and 200, in which like reference numerals designate identical or corresponding elements, however, some of the inputs and outputs are different and are described below. In particular, the motion integrator 300 includes a first inverse kinematics function 302a and a second inverse kinematics function 302b.

The command pose 301 is provided to the first inverse kinematics function 302a executed by the controller 21a. The inverse kinematics function 302a is a virtual kinematic function and calculates an initial set of joint parameters, such as angles for the joints 44a, 44b, 44c, that achieve the command pose 301. Thus, the inverse kinematics function 302a outputs virtual joint parameters 303a, which are supplied to the forward kinematics function 304 and to the force feedback function 306. The virtual joint parameters 303a are calculated in a virtual workspace, which is larger than the physical workspace defining physical limits of motion for the joints 44a, 44b, 44c and encompasses the physical workspace.

Thus, the joint ranges of motion are expanded by a predetermined amount with respect to the joint range of motions of the robotic arm 40 and the joint velocity limits are also lifted. Thus, the inverse kinematics function 302a controls a virtual robotic arm 40 that has the same kinematic frames as the actual/physical robotic arm 40, but has slightly more relaxed joints ranges, and has no limit on the speed.

The output of the inverse kinematics function 302a is the desired joint parameter 303a for the virtual robotic arm 40. The angles stay in the virtual workspace of the virtual robotic arm 40, because the previous command for the virtual robotic arm 40 is taken at the output of the command pose 301 (after passing the joint angles through the forward kinematics function 304). In this regard, the motion integrator 300 resembles the scheme of the motion integrator 100. The forward kinematics function 304 computes the position of the robotic arm 40 from specified values for the joint parameters. Thus, given the joint angle values, forward kinematics function 304 calculates the end effector location in the coordinate space.

Position output 305 of the forward kinematics function 304 is supplied to the second inverse kinematics function 302b, which calculates actual joint parameters 303b that are then supplied to the force feedback function 306. The output of the forward kinematics function 304 also serves as the input to the second inverse kinematics function 302b with standard parameters, calculating the joint parameters 303b to be sent out to the robotic arm 40 operating in the physical workspace. Since the workspace of the virtual robotic arm 40 is larger than the standard, physical workspace of the robotic arm 40, the joint parameters 303a provided to the force feedback function 306 create the force feedback even if the joint range of motions of the robotic arm 40 are breached. In this regard, the approach resembles the scheme of the motion integrator 200.

Thus, the force feedback function 306 uses the virtual and actual joint parameters 303a and 303b in calculating haptic feedback parameters, such as amplitude, frequency, and duration, that are provided through the handle controllers 38a and 38b. The forward kinematics function 304 also provides the position output 305 to a pose reset function 308, which also receives as input an initial condition and the reset signal. In addition, the output of the pose reset function 308 is combined with the command pose 301.

The singular configurations, namely, configurations in which the robotic arm 40 cannot physically displace the end-effector along certain directions, are naturally avoided by leaving them out of the defined workspace for the virtual robotic arm 40. In this scheme, the position output 305 that is provided to the second inverse kinematics function 302b starts within the workspace of the robotic arm 40, and stays close enough to avoid singular configurations, while generating enough discrepancy for force feedback when needed. It has superior handling of the motion near the point "P", without generating jumps or high velocities when the instrument 50 is operated at the minimum depth.

The motion integrator 300 calculates the command pose 301 and runs the command pose 301 through the first inverse kinematics function 302a with virtual robot kinematic parameters, joint parameters 303a, and then runs the resulted desired virtual joints through the forward kinematics function 304. This keeps the final output of the joint parameters 303a within the virtual workspace of the virtual robotic arm 40. The second inverse kinematics function 302b uses actual joint range of motion limits (including the wrist pitch angle limit) and performs joint velocity limiting. The virtual robot range of motion limits are derived from the actual robot range of motion limits by adding offsets and expanding the range. The inverse kinematics function 302a also performs external end-effector velocity limiting. This allows for the pose reset function 308 to work properly as described below.

The pose reset function 108, 208, 308 of the motion integrators 100, 200, 300 determines on which of the previously command pose 101, 201, 301 that the motion integrator 100, 200, 300 will integrate. For brevity, only the pose reset function 308 of the motion integrator 300 is described below since the pose reset functions 108 and 208 of the motion integrators 100 and 200 function the same way.

The pose reset function 308 receives three different poses as inputs, namely, the position output 305 of the forward kinematics function 304, measured pose of the robotic arm 40, namely, joint angles of the joints 44a, 44b, 44c, and the reset signal. The reset signal may be either a low (e.g., off)

value or a high (e.g., on) value and is set to high in response to output of the controller 21, namely, the joint parameters 303b output by the second inverse kinematics function 302b, transitioning from low to high. Whenever the reset input is high, the output of the pose reset function 308 is set to the measured pose. This way, the measured joints are commanded into desired joints right before the instrument drive unit 52 and other subsystems of the robotic arms 40 are commanded to transition into local position control.

The second case that is handled by the pose reset function 308 is in response to clutch input transitions at the handle controllers 38a and 38b from low to high, signaling that teleoperation is exited. At this event, the output of the pose reset function 308 is set to the previous command pose, i.e., the last commanded pose to the subsystems of the robotic arm 40, hence the robotic arm 40 is within the workspace boundaries. This is done in order to avoid having residual force feedback when the clinician leaves teleoperation while experiencing workspace related force feedback and returns back to teleoperation.

The third case is the default case where the output of the motion integrator 300 is delayed for one sample and returned as the previous command pose value. This pose that can potentially go to the virtual workspace boundaries.

The motion integrator 300 establishes, at the end, a scheme where at each time-stamp, a delta rotation matrix is applied (through matrix multiplication) to the previously calculated orientation command, resulting in the current orientation command. Normally, the successive orientation commands deteriorate in numerical properties due to accumulating round-off error in the multiplication. In particular, the output of the multiplication fails to represent a rotation matrix after several steps are taken. While there are methods to overcome this numerical issue, such as ortho-normalization, using quaternions, the disclosed motion integrator 300 does not suffer from such deterioration. As shown in FIG. 8, the calculated pose goes through the inverse kinematics function 302a then the forward kinematics function 304, before being tagged as the pose command. Going from rotation matrices space, back to joint space, and then to rotation matrices space prevents accumulation of abovementioned round-off error. At each step, the final orientation command calculated by the motion integrator 300 is a rotation matrix to the numerical precision.

As shown above in FIG. 8, the first and second inverse kinematics functions 302a and 302b are executed in series. In embodiments, the first and second inverse kinematics functions 302a and 302b may be executed in parallel and would receive the command pose 301 as input. However, each of the first and second inverse kinematics functions 302a and 302b still have the same boundaries as described above with respect to FIG. 8. Similarly, the second inverse kinematics function 302b is used to generate the desired position commands for the actual robotic arm 40 and the first inverse kinematics functions 302a is used to generate a solution only for generating the force feedback.

The new commands outputted from the motion integrator function 508 is passed through the inverse kinematics function 510. The inverse kinematics function 510 calculates angles for the joints 44a, 44b, 44c of the robotic arm 40 that achieve the scaled and adjusted pose input by the handle controller 38a. The calculated angles are passed to the robotic arm controller 41c, which includes a joint axis controller having a proportional-derivative (PD) controller, the friction estimator module, the gravity compensator module, and a two-sided saturation block, which is configured to limit the commanded torque of the motors of the joints 44a, 44b, 44c.

The output of the inverse kinematics function 510, e.g., the calculated angles are passed through the forward kinematics function 512 executed by the controller 21a to calculate the remote center point "P" pose based on the calculated angles for the joints 44a, 44b, 44c.

While several embodiments of the disclosure have been shown in the drawings and described herein, it is not intended that the disclosure be limited thereto, as it is intended that the disclosure be as broad in scope as the art will allow and that the specification be read likewise. Therefore, the above description should not be construed as limiting, but merely as examples of particular embodiments. Those skilled in the art will envision other modifications within the scope and spirit of the claims appended hereto.

What is claimed is:

1. A surgical robotic system comprising:
   a robotic arm including a plurality of joints and a surgical instrument; and
   a surgical console including:
      at least one interface device configured to receive a user input; and
      a controller configured to:
         output a command pose based on the user input, wherein the robot arm is configured to move in response to the command pose;
         store a preceding command pose as a previous command pose;
         process the command pose through a hand pose transform function to generate a desired pose;
         store a preceding desired pose as a previous desired pose, and
         determine a desired delta pose command by comparing the desired pose to the previous desired pose and the previous command pose;
         calculate a virtual joint state using first inverse kinematics with expanded joint limits;
         calculate a physical joint state by mapping the virtual joint state through forward kinematics and second inverse kinematics;
         generate force feedback based on the virtual joint state and the physical joint state;
         output a final pose command based on the virtual joint state; and
         move the robotic arm in response to the final pose command.

2. The surgical robotic system according to claim 1, wherein the desired delta pose command includes a delta position command, a delta orientation command, and a delta jaw command.

3. The surgical robotic system according to claim 2, wherein the controller is further configured to process the desired delta pose command through a velocity limiting function to apply at least one velocity limit on the desired delta pose command and to adaptively generate limits for a translational velocity of the delta position command based on a distance of the surgical instrument to a remote center point.

4. The surgical robotic system according to claim 3, wherein the limits for the translational velocity of the delta position command includes a maximum translational velocity.

5. The surgical robotic system according to claim 4, wherein the maximum translational velocity is based on a maximum allowed speed for a distal end portion of surgical instrument, minimum allowed distance for teleoperation, and distance of the surgical instrument to the remote center point.

6. The surgical robotic system according to claim 3, wherein the velocity limiting function is configured to convert the delta orientation command to an axis angle representation, wherein the axis angle representation includes a rotation axis and amount of rotation around the axis.

7. The surgical robotic system according to claim 6, wherein the velocity limiting function is further configured to adaptively generate limits on a rotational velocity of the amount of rotation around the axis while the axis rotation remains unchanged.

8. The surgical robotic system according to claim 7, wherein the velocity limiting function is further configured to generate limits of the rotational velocity of the delta orientation command based on one of: the amount of rotation around the axis with the rotational velocity limits and the axis rotation or the distance of the surgical instrument to a remote center point and pitching of the surgical instrument.

9. The surgical robotic system according to claim 1, wherein the controller is further configured to process the command pose and the desired delta pose command through a motion integrator algorithm to generate haptic feedback regardless whether the robotic arm is at a boundary of a physical workspace of the robotic arm.

10. A surgical robotic system comprising:
a robotic arm including a plurality of joints and a surgical instrument; and
a surgical console including:
at least one interface device configured to receive a user input; and
a controller configured to:
output a command pose based on the user input, wherein the robot arm is configured to move in response to the command pose;
store a preceding command pose as a previous command pose;
process the command pose to generate a desired pose;
store a preceding desired pose as a previous desired pose;
determine a desired delta pose command by comparing the desired pose to the previous desired pose and the previous command pose;
calculate a virtual joint state using first inverse kinematics with expanded joint limits;
calculate a physical joint state by mapping the virtual joint state through forward kinematics and second inverse kinematics;
output a final pose command based on the virtual joint state; and
move the robotic arm in response to the final pose command.

11. The surgical robotic system according to claim 10, wherein the desired delta pose command includes a delta position command, a delta orientation command, and a delta jaw command and the controller is further configured to generate a maximum translation velocity for the delta position command of the desired delta pose or generating a minimum and maximum rotational velocity of the delta orientation command of the desired delta pose.

12. A method for controlling a surgical robotic system, the method comprising:
receiving a user input through at least one interface device coupled to a surgical console, the user input including a movement command to move at least a portion of a robotic arm including a plurality of joints and a surgical instrument;
outputting a command pose based on the user input;
storing a preceding command pose as a previous command pose;
processing the command pose to generate a desired pose;
storing a preceding desired pose as a previous desired pose;
determining a desired delta pose command by comparing the desired pose to the previous desired pose and the previous command pose; and
calculating a virtual joint state using first inverse kinematics with expanded joint limits;
calculating a physical joint state by mapping the virtual joint state through forward kinematics and second inverse kinematics;
generating force feedback based on the virtual joint state and the physical joint state;
outputting a final pose command based on the virtual joint state; and
moving the robotic arm in response to the final pose command.

13. The method according to claim 12, wherein the desired delta pose command includes a delta position command, a delta orientation command, and a delta jaw command.

14. The method according to claim 13, further comprising:
processing the desired delta pose command through a velocity limiting function to apply at least one velocity limit on the desired delta pose command, wherein processing the desired delta pose command through the velocity limiting function includes adaptively generating limits for a translational velocity of the delta position command based on a distance of the surgical instrument to a remote center point.

15. The method according to claim 14, wherein the limits for the translational velocity of the delta position command includes a maximum translational velocity.

16. The surgical robotic system according to claim 15, wherein the maximum translational velocity is based on a maximum allowed speed for a distal end portion of surgical instrument, the minimum allowed distance teleoperation is permitted, and the distance of the surgical instrument to the remote center point.

17. The surgical robotic system according to claim 14, wherein processing the desired delta pose command through the velocity limiting function includes converting the delta orientation command to an axis angle representation including a rotation axis and amount of rotation around the axis.

18. The surgical robotic system according to claim 17, wherein converting the delta orientation command to an axis angle representation includes adaptively generating limits on a rotational velocity of the amount of rotation around the axis while the axis rotation remains unchanged.

19. The surgical robotic system according to claim 18, wherein processing the desired delta pose command through the velocity limiting function includes generating limits of the rotational velocity of the delta orientation command based on one of: the amount of rotation around the axis with the rotational velocity limits and the axis rotation or the distance of the surgical instrument to a remote center point and pitching of the surgical instrument.

20. The surgical robotic system according to claim 12, wherein the method further includes processing the command pose and the desired delta pose command through a motion integrator algorithm to generate haptic feedback regardless whether the robotic arm is at a boundary of a physical workspace of the robotic arm.

\* \* \* \* \*